United States Patent [19]

Dosjoub et al.

[11] Patent Number: 4,703,650

[45] Date of Patent: Nov. 3, 1987

[54] CIRCUIT FOR THE CODING OF THE VALUE OF TWO VARIABLES MEASURED IN A TIRE, AND DEVICE FOR MONITORING TIRES EMPLOYING SUCH A CIRCUIT

[75] Inventors: Andre Dosjoub, Chamalieres; David Myatt, Pompignat, both of France

[73] Assignee: Compagnie Generale des Etablissements Michelin, Clermont-Ferrand, France

[21] Appl. No.: 877,844

[22] Filed: Jun. 24, 1986

[30] Foreign Application Priority Data

Jul. 3, 1985 [FR] France .................................. 85 10515

[51] Int. Cl.$^4$ .......................... B60C 23/04; G01L 9/04
[52] U.S. Cl. ...................................... 73/146.5; 73/714; 73/726; 374/143
[58] Field of Search .................... 73/146.5, 152, 766, 73/726, 727, 753, 714; 374/143

[56] References Cited

U.S. PATENT DOCUMENTS

| | | | |
|---|---|---|---|
| 4,052,696 | 10/1977 | Enabnit | 73/146.5 |
| 4,195,349 | 3/1980 | Balkanli | 374/143 |
| 4,389,884 | 6/1983 | Aguilia | 73/146.5 |
| 4,414,853 | 11/1983 | Bryzek | 73/766 |
| 4,467,641 | 8/1984 | Abraham | 73/146.5 |
| 4,567,459 | 1/1986 | Folger et al. | 340/58 |

FOREIGN PATENT DOCUMENTS 0016991 3/1980 European Pat. Off. .
2122757 7/1983 United Kingdom .

*Primary Examiner*—Donald O. Woodiel
*Attorney, Agent, or Firm*—Brumbaugh, Graves, Donohue & Raymond

[57] ABSTRACT

A coding circuit comprises an astable multivibrator which transforms the measurement of the variables in question, for instance pressure and temperature, into a time measurement. The astable multivibrator delivers a pulse signal whose pulse width is a function of the temperature and the cyclic ratio of which is a function of the pressure.

12 Claims, 15 Drawing Figures

CIRCUIT FOR THE CODING OF THE VALUE OF TWO VARIABLES MEASURED IN A TIRE, AND DEVICE FOR MONITORING TIRES EMPLOYING SUCH A CIRCUIT

BACKGROUND OF THE INVENTION

The present invention relates to devices for the monitoring of tires. More particularly, it relates to the transmission of the pressure and temperature of the tire to the chassis of the vehicle without galvanic contact.

The state of the art contains numerous attempts directed at advising the driver of a vehicle of a decrease in the pressure of one of his tires. U.S. Pat. No. 4,389,884 proposes that the detection be effected by means of bellows which move a ferrite within a coil in order to modify the value of the inductance thereof as a function of the pressure. The transmission is effected by inductive coupling between two coils, one fastened to the rim and the other to a part of the vehicle which is not movable in rotation. European Pat. No. 45,401 contemplates feeding an active circuit arranged in the tire with energy, modulating an electric signal in frequency as a function of the pressure, transmitting the signal towards the chassis by inductive coupling, and analyzing this signal as a function of various parameters. Among the various arrangements which independently monitor two or more variables within the tire, mention may be made of U.S. Pat. No. 4,052,696 which describes an arrangement which gives a warning when a pressure threshold or temperature threshold is exceeded.

The known devices have proven unable to assure reliable and precise monitoring of the condition of a tire. The behavior of a tire is, as a matter of fact, very complicated and the monitoring thereof cannot be reduced to the simple detection of a threshold. It is desirable to know continuously the pressure and the temperature prevailing within the tire. As already stated, it is not sufficient to transmit a threshold-exceeding signal of the parameters considered; it is necessary for a monitoring device to be able to transmit a measurement of said parameters, the measurements transmitted being capable of use for direct reading or being processed by an analysis system which controls a warning unit located on the instrument panel.

SUMMARY OF THE INVENTION

The object of the invention is to permit the construction of an arrangement for monitoring the condition of a tire which is capable of transmitting the value of two variables measured within the tire.

Another object of the invention is to provide a circuit for coding the value of two variables measured in a tire which permits transmission of the values to the chassis of the vehicle without galvanic contact.

A further object of the invention is to provide a monitoring device, equipped with such a circuit, which takes up as little space as possible, which is without mechanical parts and which is simple and reliable.

According to the invention, the circuit for coding the value of two variables measured in a tire, which permits the transmission of the values to the chassis bearing the tire without galvanic contact, is characterized by the fact that the circuit comprises:

(a) a first unit the transfer function of which is a function of the first of the variables measured;

(b) means which make it possible to connect to the input of the first unit either a reference voltage or a voltage which is a function of the second of the variables measured;

(c) a second unit controlled by the output signal of the first unit and delivering a pulse signal the parameters of which bear the values of the measured variables.

By "pulse signal" there is understood a rectangular wave whose "parameters" are the width of the period during which this signal is in high state and the width of the period during which the signal is in low state, or else one of these two widths and the cyclic ratio of the signal.

DESCRIPTION OF THE DRAWINGS

The accompanying drawings will make it possible to understand more readily the invention and to grasp all of its advantages. They show two non-limitative embodiments of the invention applied to the measuring of the pressure and temperature prevailing within a tire.

DETAILED DESCRIPTION OF THE INVENTION

Figure 1:
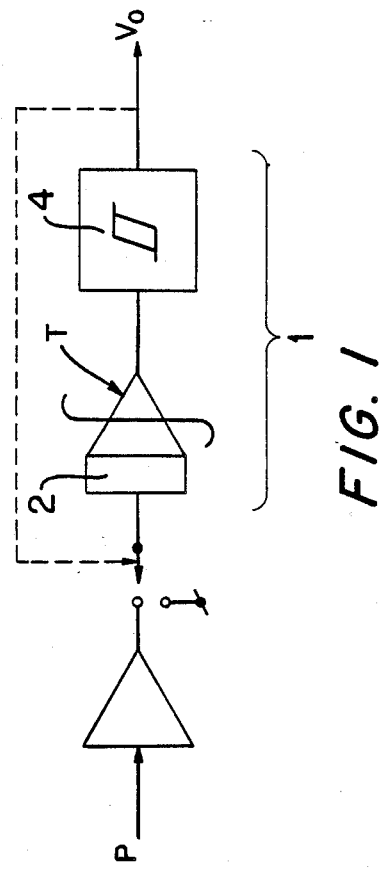
FIG. 1 is a synoptic diagram of the coding circuit of the invention.

The principle of operation of the coding circuit shown in FIG. 1 is to transform the measurement of the variables in question into time measurements by means of an astable multivibrator 1 which delivers a pulse signal $V_o$ whose pulse width is a function of the first of the variables measured, namely the temperature of the tire in the examples considered, and the cyclic ratio of which is a function of the second of the variables measured, namely the pressure of the tire in these examples.

The multivibrator 1 comprises a first unit 2 whose transfer function is that of an integrator, receiving at its input either a reference or a signal which is an image of the second variable measured, and then a second unit 4 which transforms the output of the first unit 2 into a pulse signal. This coding circuit therefore permits the simultaneous transmission of two values, one coded by the cyclic ratio of the pulse signal and the other by the width of a pulse. However, this application is not limitative; with the same circuit one can just as well transmit successively in time first of all the values of two measured variables and then the values of two other measured variables.

Figure 2:
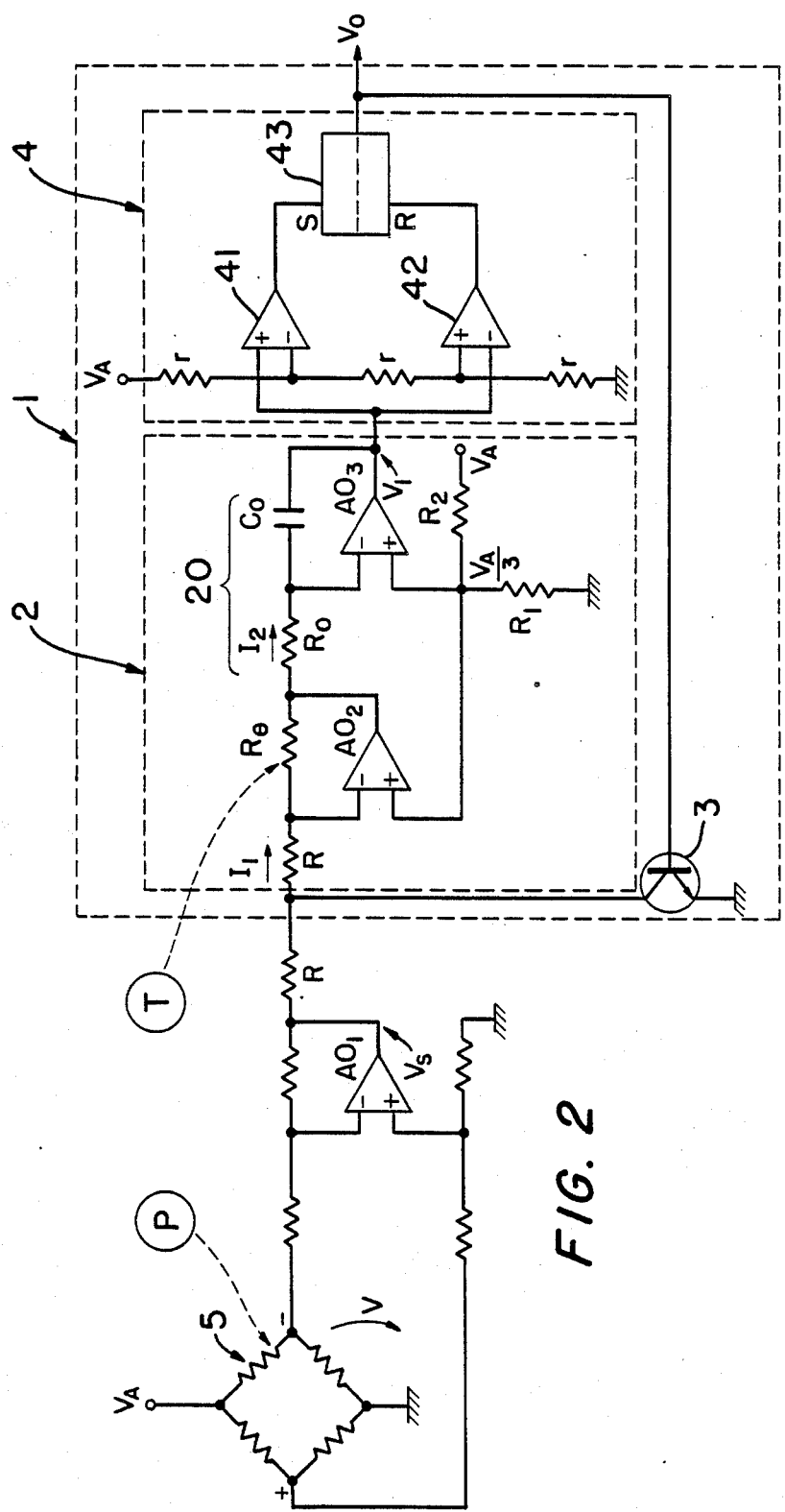
FIG. 2 is a diagram of the circuit in accordance with the first embodiment.

Referring now to FIG. 2, it is seen that the coding circuit comprises a first unit 2 formed essentially of an integrator 20, the time constant of the unit 2 being a function of the first of the variables measured (in this example, the first variable is the temperature). This integrator 20 comprises a circuit containing at least one operational amplifier AO3, a resistor $R_o$ being connected to the inverting input and a condenser $C_o$ being inserted in the feedback circuit. This is the classic manner of using an operational amplifier as integrator. A voltage is applied to the non-inverting input of the operational amplifier AO3 via a resistance divider bridge formed of the resistors $R_1$ and $R_2$, the calibrating role of which as a function of the second variable measured is explained further below. A silicon temperature detector $R_\theta$ is used the characteristics of which (internal resistance, sensitivity, linearity, reliability) correspond precisely to the needs of this application. This detector $R_\theta$ is mounted in the feedback loop of an additional operational amplifier AO2 connected as amplifier the output of which acts on the operational amplifier AO3 connected as integrator via the resistor $R_o$. The voltage delivered by the resistance divider bridge formed of the resistors $R_1$ and $R_2$ is applied also to the non-inverting input of the operational amplifier AO2.

The integrator (i.e. the first unit 2) delivers a voltage $V_I$. This voltage $V_I$ is the input signal of a unit 4 which permits the referencing of two thresholds, in this case by means of two comparators 41 and 42, a resistance divider bridge formed of three resistors r connected in series to deliver the threshold voltages, and a flipflop 43. By "referencing of two thresholds" there is understood the locating of the times when the signal $V_I$ in question reaches one of said thresholds; this unit delivers a pulse signal which bears values of the variables measured.

The coding circuit furthermore comprises a transistor 3 connected with common emitter, the base of which is controlled by the output signal of the flipflop 43 and the collector of which is connected to the input of the first unit 2. An operational amplifier AO1 delivers a signal $V_S$ which is also applied to the input of the first unit 2 via resistor R the role of which is to avoid short-circuiting the output of the operational amplifier AO1 when the transistor 3 is open. The operational amplifier AO1 is connected as a differential amplifier. At the input it receives a voltage delivered by a detector which is sensitive to the second measured variable, namely the pressure in this embodiment of the coding circuit. It is important that the detector selected be electrically equivalent to a Wheatsone bridge or, more generally, deliver a voltage which is proportional to the variable measured. As pressure detector 5 there is preferably used a piezoresistive gauge the gauge factor of which is higher than that of a conventional gauge of the metallic type.

The operation of the coding circuit will now be explained with more particular reference to FIGS. 2a to 2f which show time diagrams of the principal signals present in the circuit.

Figure 2A:
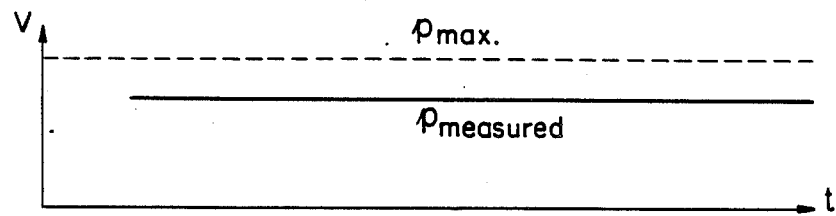
FIGS. 2a to 2f are time diagrams of the principal signals, serving to explain the operation of the coding circuit shown in FIG. 2.
Figure 2B:
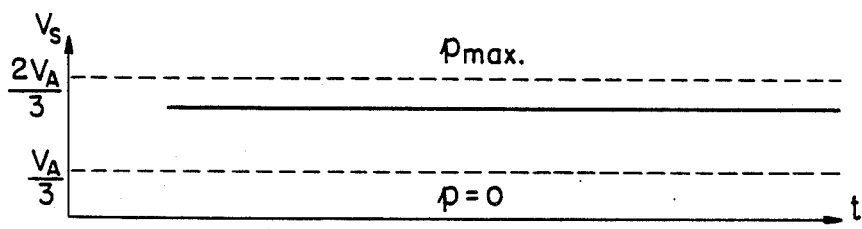

By virtue of the pressure-detector selected, which is sensitive to the absolute pressure, the voltage v delivered varies proportionally between zero and a value corresponding to the maximum pressure for which the monitoring device is designed, which is indicated in FIG. 2a by the dashed line marked with the parameter "$p_{max}$". Let us consider the value of the signal v indicated by the solid horizontal line marked "$p_{measured}$" (we will assume that the pressure remains constant during the period of time considered). FIG. 2b shows the signal $V_S$, which varies between the levels of the parameters "$p_{max}$" and "$p=0$." As a function of the dimensioning of the range of operation of the operational amplifier AO1, let us consider that the limit values of $V_S$ are $$(V_A/3) \text{ and } (\tfrac{2}{3})V_A$$

($V_A$ being the feed voltage of the coding circuit), which in no way reduces the generality of the demonstration. The following relationship is immediately established:

$$V_S = (V_A/3)(p/p_{max}) + (V_A/3)$$

Figure 2C:
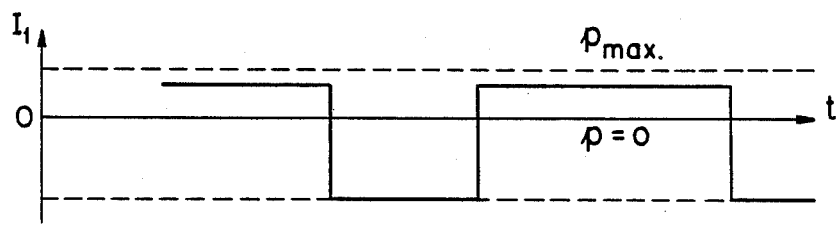

FIG. 2c gives a time diagram of the signal $I_1$, the current passing through the resistor R which is arranged at the input of the first unit 2. During the period of time $T_p$, the transistor 3 is blocked and this current is a function of the difference in potential between the voltage at the inverting input of the operational amplifier AO2 and $V_S$. During the period of time $T_o$, the transistor 3 is unblocked and therefore the current $I_1$ is a function of the voltage at the inverting input of the operational amplifier AO2 since the reference here is the ground. By application of the rules of operation of operational amplifiers, the voltage at the input of the operational amplifier AO2 (and furthermore of the operational amplifier AO3) is adjusted so that the current $I_1$ is zero if the absolute pressure is zero. As a variant, the current $I_1$ corresponding to an absolute pressure of zero can be adjusted to any value. By reference to FIG. 2b and to the above explanations it is seen that said voltage is $V_A/3$). Thus the coding circuit is calibrated relative to the pressure. Using the expression for $V_S$, it is immediately deduced that:

during the period of time $T_p$, $$I_1 = \frac{V_S - \frac{V_A}{3}}{2R} = \frac{\frac{V_A}{3} \frac{p}{p_{max}}}{2R}$$

during the period of time $T_o$, $$I_1 = (-V_A/3)(1/R)$$

Figure 2D:
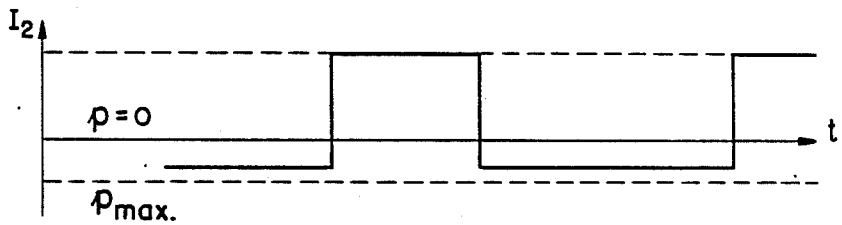

FIG. 2d shows the current $I_2$ passing through the resistor $R_o$. By a simple application of the fundamental rules of operation of the operational amplifier AO2 connected as amplifier it is calculated, respecting the polarities selected, that $$I_2 = -(R_\theta/R_o)I_1,$$

which gives
during the period of time $T_p$ $$I_2 = -\frac{R_\theta}{R_o} \frac{1}{2R} \frac{V_A}{3} \frac{p}{p_{max}} \quad \text{(Equation 1)}$$

during the period of time $T_o$ $$I_2 = \frac{R_\theta}{R_o} \frac{1}{R} \frac{V_A}{3} \quad \text{(Equation 2)}$$

Figure 2E:
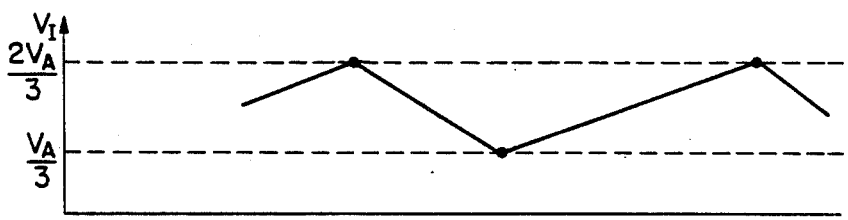

FIG. 2e shows the law of variation of the voltage $V_I$ at the output of the integrator 20. As the operational amplifier AO3 operates as an integrator, the voltage at the terminals of the condenser $C_o$ is in accordance with the law $$\frac{dv}{dt} = -\frac{I_2}{C_o}$$

Thus, during the period of time $T_p$, the variation of $V_I$ as a function of time is represented by an ascending ramp, while during the period of time $T_o$ it is a descending ramp. We may note that the slope of the ascending ramp depends both on the pressure (p in Equation 1)

and on the temperature ($R_\theta$ in Equation 1) while the slope of the descending ramp depends only on the temperature ($R_\theta$ in Equation 2).

The limit values of $V_I$ are established by the thresholds referenced by the comparators 41 and 42

$$\left(\frac{2V_A}{3} \text{ and } \frac{V_A}{3}\right.$$

respectively).

Let us consider the signal $V_I$ during the period $T_p$. As soon as $V_I$ exceeds the value $(2^V A/3)$, the comparator 41 sends a pulse to the S (set) input of the flipflop 43 which therefore delivers a high signal which, applied to the transistor 3, unblocks it. The input of the first unit 2 is therefore grounded, which has the effect of causing the manner of operation described for the period $T_o$ to start. As soon as the signal $V_I$ becomes less than $(V_A/3)$ the comparator 42 sends a pulse to the R (reset) input of the flipflop 43 which therefore delivers a low signal (zero volt), which blocks the transistor 3. The operating mode described for the period $T_p$ starts. The form of the signal $V_I$ makes it possible to write $$\frac{\Delta V_I}{\Delta t} = -\frac{I_2}{C_o} \text{ and therefore } \Delta t = -\frac{C_o}{I_2}\Delta V_I$$

which gives $$T_p = -\frac{C_o}{I_2}\frac{V_A}{3} = \frac{C_o R_o 2R}{R_\theta}\frac{p_{max}}{p} \quad \text{(Equation 3)}$$

and $$T_o = -\frac{C_o}{I_2}\left(-\frac{V_A}{3}\right) = \frac{C_o R_o R}{R_\theta} \quad \text{(Equation 4)}$$

The above equations show that the periods $T_o$ and $T_p$ are independent of the feed voltage $V_A$, which is still subject to fluctuations for a circuit intended to be implanted on a wheel, whatever the manner of feed, by storage cell (progressive discharge) or by condenser charged by inductive coupling, as indicated in European Pat. No. 45,401 (rapid discharge). It follows from Equation 4, using the resistance-temperature characteristic of the detector $R_\theta$, that the temperature measured is a function of the period of time $T_o$. By introducing into Equation 3 the value $R_\theta$ obtained from Equation 4, one obtains, by a few elementary calculations, the expression for the pressure $$p = 2p_{max}\frac{T_o}{T_p}$$

It is therefore seen that the measurement of two variables has been replaced by time measurements, which are furthermore independent of the feed voltage of the circuit which lends itself particularly well to the reliable transmission of the measured variables between a wheel and the chassis of a vehicle.

Figure 2F:
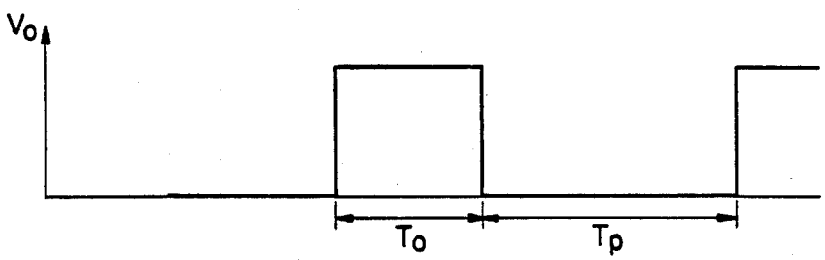

FIG. 2f shows the output signal $V_o$ of the coding circuit of FIG. 2. The output signal is actually that of an astable multivibrator since, in practice, one does not measure pressures less than atmospheric pressure and therefore the current $I_2$ is never zero. Thus the temperature is a function of the pulse width of the signal $V_o$ and the pressure is a function of the cyclic ratio of said signal $V_o$. Electronic components of CMOS technology are preferably employed in order to minimize the circuit consumption. The circuit can be formed with discrete components or, preferably, in the form of a hybrid or integrated circuit for most of these elements.

Figure 3:
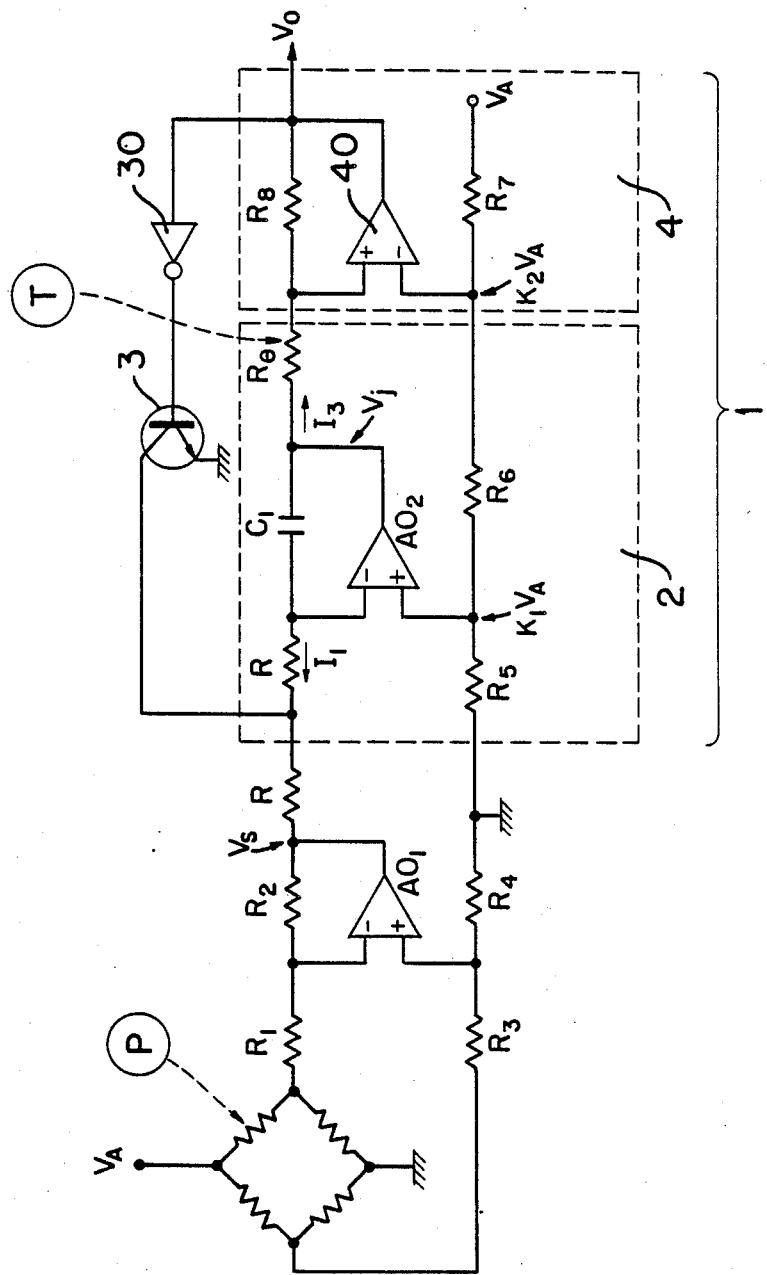
FIG. 3 is a diagram of the circuit in accordance with another embodiment.
Figure 3A:
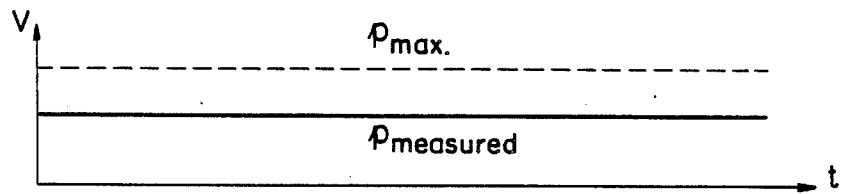
FIGS. 3a to 3f are time diagrams of the principal signals of the coding circuit shown in FIG. 3.
Figure 3B:
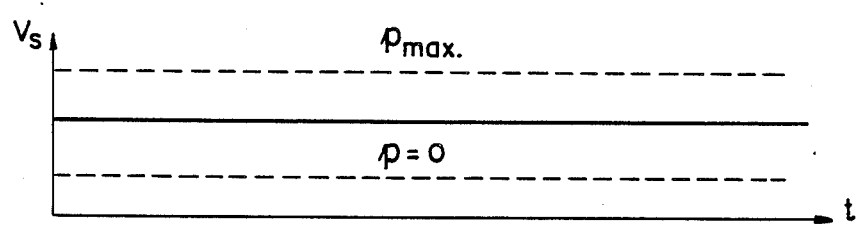

Another embodiment of the coding circuit according to the invention is proposed in FIG. 3. The first unit 2, whose transfer function is a function of the first of the measured variables, comprises only a single operational amplifier connected as integrator A2, and then, at the output of this amplifier, a temperature-sensitive resistor $R_\theta$. There is then a second unit which makes it possible to effect the referencing of two thresholds by means of a single comparator 40. For this purpose, the comparator receives, on the one hand, a reference voltage formed of a fraction of the feed voltage namely $k_2 V_A$, and, on the other hand, a signal which is a function both of the output of the integrator $A_2$, and therefore of the output of the first unit 2 and of the output of the second unit 4, in its turn via the feedback loop formed by the branch containing the resistor $R_8$.

This second example is based on the same principle as the first and it is therefore needless to repeat the entire operation in detail. The following explanation should be consulted in parallel with FIGS. 3a to 3f which relate to the principal signals of the circuit.

The signal $V_S$ is processed in the same manner as in the first variant.

The branches containing the resistors $R_5$ to $R_7$ constitute a resistive voltage divider of the feed voltage $V_A$. Taking into account the sign convention selected for the current $I_1$ in FIG. 3 and considering the voltage $V_j$ at the output of the integrator A2, one immediately has $$\frac{dV_j}{dt} = \frac{I_1}{C_1}$$

and during the period of time $T_p$ (transistor 3 blocked):

$$I_1 = \frac{k_1 V_A - V_S}{2R}$$

hence $$\frac{dV_j}{dt} = -\frac{V_S - k_1 V_A}{2RC_1}$$

during the period of time $T_o$ (transistor 3 unblocked):

$$I_1 = \frac{k_1 V_A}{R}$$

hence $$\frac{dV_j}{dt} = \frac{k_1 V_A}{RC_1}$$

Figure 3C:
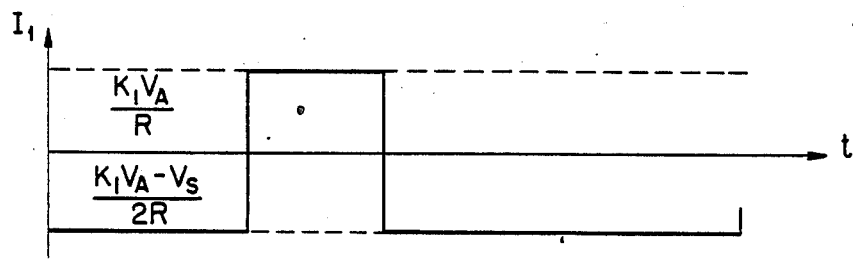
Figure 3E:
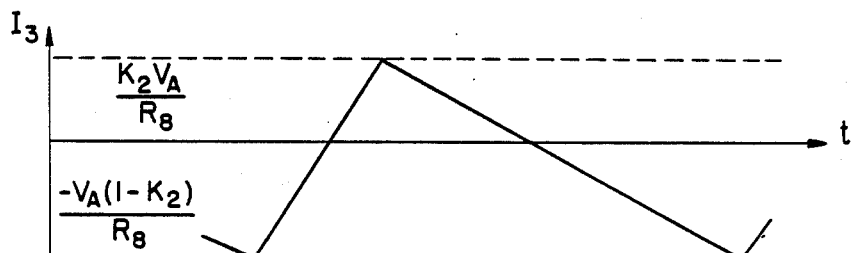

FIG. 3c represents the law of variation of $I_1$, taking into account the fact that $k_1$ must be so selected that $k_1 V_A - V_S$ is negative.

The second unit 4 comprises a comparator 40 whose output is in the low state (namely $V_o$=zero volt) when the voltage applied to the non-inverting input (namely $V_+$) is less than $k_2 V_A$ (which is true for the period $T_o$ when the output of the operational amplifier AO2 is increasing) and whose output is in the high state (namely $V_o = V_A$) when $V_+$ is greater than $k_2V_A$. Based on the sign conventional adopted for the current $I_3$ in FIG. 3, let us calculate the trigger points of the comparator 40 (see A and B in FIG. 3d):

starting from $V_o=0$, one has at B $$I_3R_8 = k_2V_A$$
hence
$$I_3 = \frac{k_2V_A}{R_8}$$

starting from $V_o = V_A$, one has at A:

$$-I_3R_8 = V_A - k_2V_A$$
hence
$$I_3 = -\frac{V_A - k_2V_A}{R_8}$$

It is therefore seen that the signal $V_o$ as a function of $I_3$ comprises hysteresis, introduced by the reaction loop containing the resistor $R_8$. This permits the referencing of two thresholds with a single comparator 40.

Let us calculate the variation $\Delta I_3$ between the two thresholds A and B:

$$I_3]_{B-A} = \frac{k_2V_A}{R_8} + \frac{V_A - k_2V_A}{R_8} = \frac{V_A}{R_8}$$

By a simple application of Ohm's law and by successive substitutions we have:

period $T_p$ (Equation 5)
$$I_3R_\theta = V_j - k_2V_A$$

$$\frac{dI_3}{dt} = \frac{1}{R_\theta} \frac{d}{dt}(V_j - k_2V_A)$$

$$\frac{\Delta I_3}{\Delta t} = \frac{-1}{R_\theta} \frac{V_S - k_1V_A}{2RC_1}$$

$$T_p = \frac{V_A}{R_8} \frac{R_\theta 2RC_1}{k_1V_A - k_3V_A\frac{p}{p_{max}} - k_3V_A}$$

by generalizing the expression for $V_S$, calculated in the description of the first embodiment $$T_p = \frac{2RR_\theta C_1}{R_8\left(k_1 - k_3 - k_3\frac{p}{P_{max}}\right)}$$

the period $T_o$: (Equation 6)
$$I_3R_\theta = V_j - k_2V_A$$

$$\frac{dI_3}{dt} = \frac{1}{R_\theta} \frac{d}{dt}(V_j - k_2V_A)$$

$$\frac{dI_3}{dt} = \frac{1}{R_\theta} \frac{k_1V_A}{RC_1}$$

$$T_o = \frac{V_A}{R_8} \frac{R_\theta RC_1}{k_1V_A}$$

$$T_o = \frac{RC_1}{k_1R_8} R_\theta$$

Equations 5 and 6 show that the periods $T_o$ and $T_p$ are this time still independent of the feed voltage. From Equation 6 it follows that the temperature (knowing the resistance-temperature characteristic of the detector $R_\theta$) is measured by $T_o$. By introducing the value of $R_\theta$ derived from Equation 6, one obtains, after a few elementary calculations, the result that the pressure is measured by the cyclic ratio $T_o/T_p$.

Figure 3F:
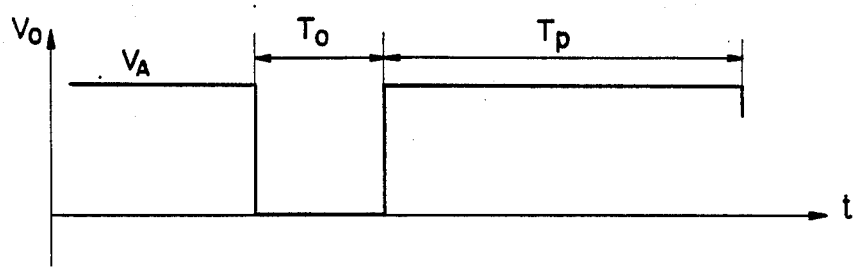
Figure 3D:
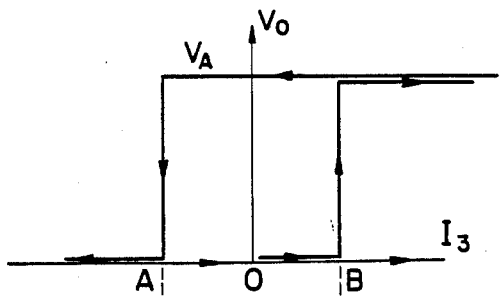

FIG. 3f shows the output signal of the coding circuit described in FIG. 3. This signal is equivalent to that supplied by the first embodiment (FIG. 2f) since, as far as logical levels are concerned, it is immaterial whether $V_o$ is at the high state or at the low state during the period $T_o$. In FIG. 3 one again finds an invertor 30 which makes it possible to control the transistor 3 in suitable manner.

The means of feeding the coding circuit as well as the means of transmitting the coded signal $V_o$ are known to the man skilled in the art and do not fall within the scope of the present invention. By way of example, in French Patent Application No. 85/10516 (corresponding to U.S. application Ser. No. 878,060 filed concurrently herewith—Attorney's File) of the present Applicants one finds the description of an energy feed stage and a signal transmission stage by inductive coupling, making it possible further to improve the overall performance of a tire monitoring system. The type of signal transmitted requires that the transmission not depend on the angular position of the wheels. In the case of transmission by inductive coupling, it is therefore necessary that the coil connected to the wheel be concentric to it. However, the tolerance for the positioning of the coils (one connected to the wheel and the other to a part of the vehicle which is not movable in rotation) may be rather large. The frequencies transmitted by inductive coupling should preferably be less than 100 kHz in order to avoid too extensive an attenuation.

What is claimed is:

1. A circuit for coding the value of two variables measured in a tire, which permits the transmission of the values to the chassis bearing the tire without galvanic contact, characterized by the fact that the circuit comprises:
    (a) a first unit the transfer function of which is a function of the first of the variables measured;
    (b) means for alternately connecting to the input of the first unit either a reference voltage or a voltage which is a function of the second of the variables measured to provide an output signal representing either said first variable or said second variable, respectively; and
    (c) a second unit controlled by the output signal of the first unit and delivering a pulse signal having parameters representing the values of the measured variables,
    said connecting means being actuated in response to said pulse signal.

2. A circuit according to claim 1, characterized by the fact that the first unit comprises essentially an integrator and by the fact that the time constant of the first unit is a function of the first measured variable.

3. A circuit according to claim 1 or 2, characterized by the fact that the second unit comprises essentially means permitting the referencing of two thresholds for the output signal of the first unit.

4. A circuit according to claim 3, characterized by the fact that the means permitting the referencing comprise two comparators and a flipflop.

5. A circuit according to claim 3, characterized by the fact that the means permitting the referencing comprise a single comparator provided with a feedback loop.

6. A circuit according to claim 1 or 2, characterized by the fact that the voltage which is a function of the second of the variables measured is applied to the input of the first unit via an operational amplifier receiving a voltage delivered by a detector responsive to the second variable.

7. A circuit according to claim 6, characterized by the fact that said second variable is the pressure prevailing in the tire and by the fact that the detector is a piezoresistive gauge.

8. A circuit according to claim 1 or 2, characterized by the fact that the connecting means are formed of a transistor mounted as a common emitter the base of which is controlled by the output of the second unit and the collector of which is joined to the input of the first unit.

9. A circuit according to claim 1 or 2, characterized by the fact that it is essentially in the form of a hybrid circuit or integrated circuit.

10. A circuit according to claim 2, characterized by the fact that the integrator is formed of a connection which comprises at least one operational amplifier, a resistor being connected to the inverting input and a condenser being inserted in the feedback circuit, a voltage being applied to the non-inverting input of the operational amplifier by a resistance divider bridge permitting calibration of the the circuit relative to the second measured variable.

11. A circuit according to claim 10, characterized by the fact that the first variable is the temperature prevailing in the tire and by the fact that a temperature detector is used in the form of a silicon resistor mounted in the feedback loop of an additional operational amplifier, the output of which acts on said one operational amplifier in the integrator.

12. A circuit according to claim 10, characterized by the fact that the first variable is the temperature prevailing in the tire and by the fact that a temperature detector is used in the form of a silicon resistor mounted at the output of said one operational amplifier in the integrator.

* * * * *